GASIFICATION OF SOLID CARBONACEOUS FUELS
Filed July 8, 1958
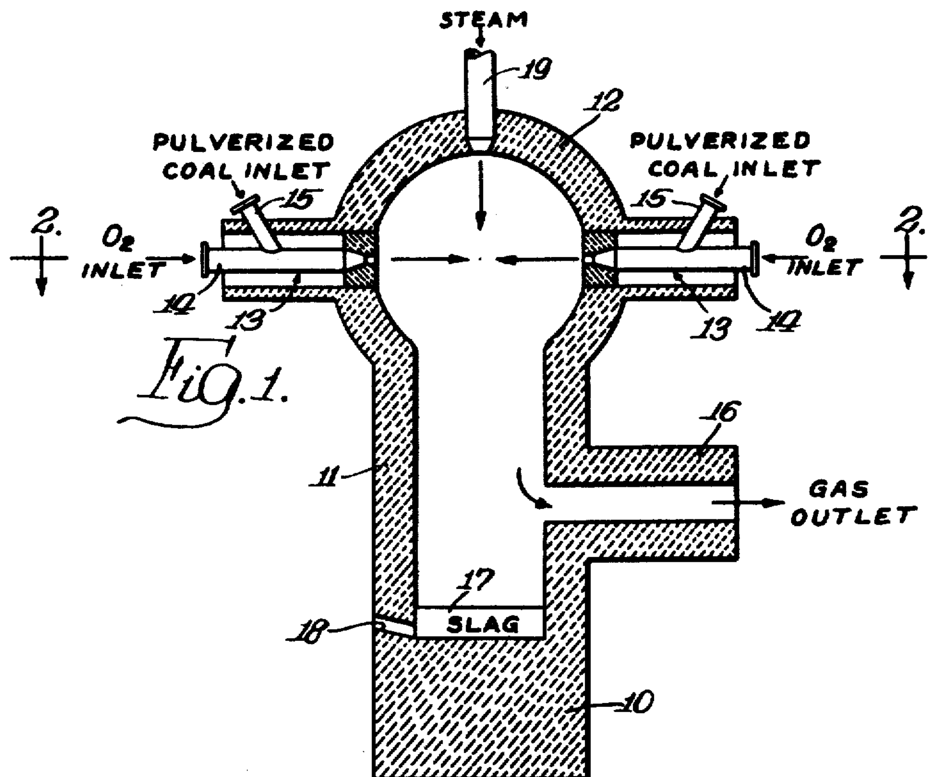
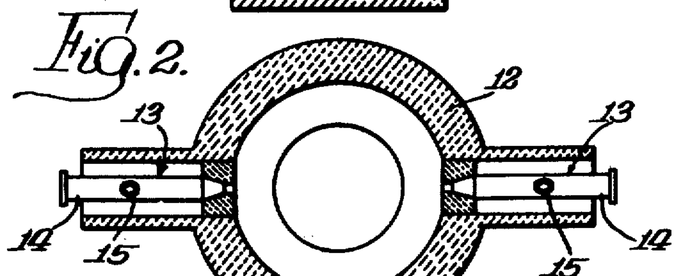
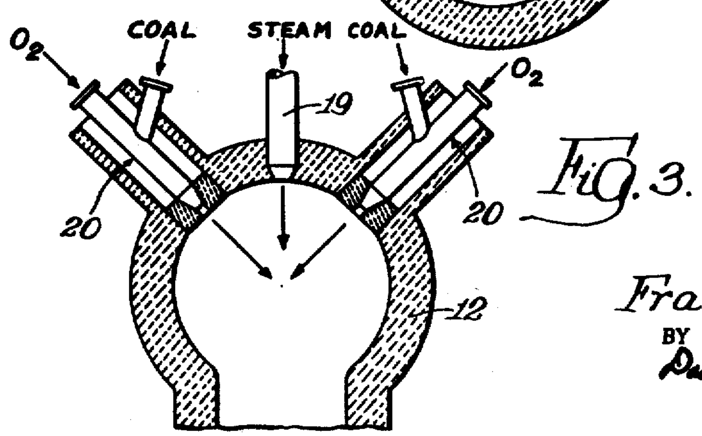
INVENTOR.
Frank W. Luerssen,
BY
Davis, Lindsey, Hibben & Noyes
Attys.

United States Patent Office 2,962,367

Patented Nov. 29, 1960

2,962,367

GASIFICATION OF SOLID CARBONACEOUS FUELS

Frank W. Luerssen, Munster, Ind., assignor to Inland Steel Company, Chicago, Ill., a corporation of Delaware Filed July 8, 1958, Ser. No. 747,138

15 Claims. (Cl. 48—206)

This invention relates to improvements in the gasification of solid carbonaceous fuels to obtain carbon monoxide. More particularly, the invention relates to an improved process for the production of a CO-rich gas or a gas rich in both CO and $H_2$.

Gasification of coal to obtain carbon monoxide or, with the introduction of steam as an auxiliary reactant, to produce a mixture of hydrogen and carbon monoxide are commercially important operations because of the demand for these gases in a number of industrial processes. For example, liquid hydrocarbons suitable for use as motor fuels and other organic chemicals may be produced by reaction of hydrogen with carbon monoxide in the Fischer-Tropsch synthesis. Carbon monoxide and hydrogen are useful, either alone or in combination, for the reduction of iron oxide ores or other metallic oxides. Hydrogen finds use in various commercial processes such as the synthesis of ammonia, hydrogenation processes, catalytic conversion of petroleum hydrocarbons, etc. Of course, both carbon monoxide and hydrogen and mixtures thereof are useful as fuel gases.

A number of attempts have been made in the past to develop a satisfactory process for the production of fuel and synthesis gases by gasification of coal in a continuous manner. For example, in one type of process heretofore proposed a downwardly moving bed of coal particles is contacted with an upwardly moving stream containing oxygen and steam. In another type of operation the gaseous reactants are passed upwardly through a bed of pulverized coal to obtain the well known fluidized operation. In still another type of process the pulverized coal is entrained or suspended in the gaseous reactants and the combined stream or mixture is fed through a burner into a suitable generator or combustion zone wherein the desired gasification occurs.

In spite of the vast amount of experimental and development work which has been done in this field, none of the processes heretofore suggested for continuous gasification of pulverized coal have achieved any significant degree of commercial success. Among other things, the problems of ash removal and efficient utilization of carbon have been serious obstacles to the development of a commercially attractive process. For example, in certain of the schemes heretofore proposed the slagging of ash so as to permit removal of ash as a molten slag has been a primary consideration. Certain proposed processes provide for a swirling or laminar type flow of gaseous reactants in order to promote the accumulation of a liquid slag on the walls of the reacting vessel with gravity drainage and withdrawal of the slag as required. With many proposed processes it is difficult to obtain the necessary intimate mixing of the gaseous reactants and the pulverized coal, and consequently it has usually been considered necessary to resort to superatmospheric pressure operation in order to obtain more intimate contact between the reacting species. However, at elevated pressures the reaction between carbon dioxide and carbon to form carbon monoxide is seriously hindered inasmuch as this reaction results in a volume increase so that the reaction is obviously favored by low pressures. It is my belief that these conflicting effects have resulted in a compromise characterized by less than optimum efficiency of conversion of carbon to carbon monoxide with excessive amounts of $CO_2$ and methane or other hydrocarbons in the product gas.

Accordingly, a primary object of the present invention is to provide a novel and improved method for the sustained continuous gasification of subdivided solid carbonaceous fuel to produce a CO-rich gas which is unusually low in $CO_2$ and methane and other hydrocarbons.

Another object of the invention is to provide a novel and improved process of the foregoing character in which the pulverized fuel is supplied to a combustion zone in suspension in an oxygen-containing gas.

A further object of the invention is to provide a novel and improved method for the gasification of coal or other solid carbonaceous fuel which is characterized by a high degree of turbulence in the combustion zone and a high degree of efficiency of conversion of carbon to CO.

Still another object of the invention is to provide a novel and improved process as characterized above which also possesses the additional advantage of being operable at a substantially atmospheric pressure.

Other objects and advantages of the invention will become apparent from the subsequent detailed description taken in conjunction with the accompanying drawing wherein:

Fig. 1 is a diagrammatic sectional view of one type of apparatus which is suitable for carrying out the process of the present invention.

Fig. 2 is a transverse sectional view taken along the line 2—2 of Fig. 1; and

Fig. 3 is a fragmentary sectional view showing a modification of the apparatus illustrated in Fig. 1.

Broadly speaking, my invention is based on the discovery that a highly efficient sustained gasification of pulverized coal or the like can be obtained at atmospheric or substantially atmospheric pressure by impinging a pair of opposed or intersecting suspensions of pulverized coal in an oxygen rich gas and regulating the relative proportions of oxygen to coal in the respective streams so that one stream has enough oxygen so as to obtain complete combustion of a substantial part of the carbon to $CO_2$ with a relatively high flame temperature and so that the other stream has an excess of fuel so as to obtain incomplete or partial combustion to CO of only a part of the carbon and thereby providing excess unburned carbon and a relatively lower flame temperature. In other words, one flame is oxidizing and has a relatively high temperature and the other flame is non-oxidizing and has a relatively lower temperature. The opposed or intersecting firing of two such differently regulated streams at atmospheric or substantially atmospheric pressure results in a high degree of turbulent intermixing of the flames and combustion products with excellent heat transfer and intimate contact between the reacting species, and I have found that such conditions are ideal for obtaining maximum conversion of carbon to CO with a minimum amount of excess or unconverted carbon in the product gas.

In the gasification of solid carbonaceous fuels with oxygen, the reaction between the oxygen and the fuel under conditions conducive to substantially complete combustion of carbon results in the production of $CO_2$ according to the equation:

$$C+O_2 \rightarrow CO_2$$

This oxidation reaction, being highly exothermic, releases large quantities of heat. On the other hand, the reaction between oxygen and fuel under conditions of partial combustion results in the production of CO according to the equation:

$$C+\frac{1}{2}O_2 \rightarrow CO$$

This oxidation reaction is also exothermic but to a considerably less extent than the oxidation of carbon in accordance with the first equation above.

Under conditions of high temperature, $CO_2$ also undergoes reduction by reaction with carbon to form CO as in the equation:

$$CO_2+C \rightarrow 2\,CO$$

This reaction is endothermic and requires heat from some other source. In the process of the present invention the $CO_2$ produced in the high temperature oxidizing flame reacts with the excess unburned carbon in the low temperature non-oxidizing flame, the endothermic heat requirements for the reduction reaction being supplied primarily by the high temperature flame or stream.

By means of the gasification scheme herein described, it is believed that the very high temperature which can be realized by the complete combustion of carbon to $CO_2$ in an oxygen-rich gas provides the necessary activation energy or driving force for accelerating the reduction reaction between $CO_2$ and carbon to produce CO. Furthermore, the direct impingement or intersection of the flames and streams of combustion products produces a high degree of turbulence due both to the mechanical effects of the impinging streams and also to the thermal effects resulting from the commingling of two streams at substantially different temperature levels. In any event, it has been found that the net result of the process is a much more complete and efficient conversion of carbon to CO than is possible on a sustained basis by any other scheme heretofore suggested. In particular, the gas produced by this process is characterized by an unusually low $CO_2$ content, e.g. not more than 10% and usually not more than 5%, and also by the fact that it is substantially free of methane and other hydrocarbons.

Although the principles of the invention are applicable to the gasification of any subdivided solid carbonaceous fuel, pulverized coal is the preferred material. However, in addition to coal, including anthracite, bituminous or sub-bituminous coal, the gasification technique may be used with lignite, peat, coke, or even oil-containing shales under some circumstances. The oxygen-rich gas introduced with the fuel should have an oxygen content substantially greater than the oxygen content of air and in general for best results the oxidizing gas should comprise at least 85% oxygen. Usually, a commercial grade of straight oxygen which may be 98–99% pure is the most desirable gas to use, but it is also within the scope of the invention to use oxygen enriched air or other inert gas mixed with oxygen.

The coal in granular or pulverized form, or other subdivided solid carbonaceous fuel, is burned with the oxidizing gas in a combustion zone by means of suitable powdered fuel burners of which many different designs are well known and do not form any part of the present invention. For best results, I prefer to employ the oxygen-rich gas as the carrier gas for the pulverized fuel so that the oxygen and fuel are thoroughly premixed prior to ignition at the burner outlet.

For the oxidizing high temperature stream, the relative proportion of oxygen to coal fed to the burner must be regulated to provide the required amount of oxygen so that a substantial portion (e.g. from about 35% to about 85% by weight) of the carbon is burned completely to $CO_2$. This type of combustion results in a high temperature flame in excess of 3000° F. and if a commercial grade of straight oxygen or a gas containing at least 85% oxygen is used, a flame temperature of from about 3200° F. to about 4200° F. or even higher can readily be obtained. Since the objective in the high temperature oxidizing flame is to obtain substantially complete combustion of carbon in the fuel to $CO_2$, the combustion conditions should be controlled so that the combustion products have a $CO_2$:CO ratio of at least about 0.5, e.g. from about 0.5 to about 5 and preferably from about 1 to about 5.

In the opposed lower temperature non-oxidizing stream the proportion of oxygen to coal is adjusted to provide an excess of carbon so that only a portion (e.g. from about 65% to about 85% by weight) of the carbon in the coal is oxidized by partial combustion to CO. As a result the flame temperature is usually not greater than 3000° F., e.g. from about 2700° F. to about 3000° F., and the combustion products contain excess unburned carbon as heretofore described. The endothermic heat requirements for the reduction reaction between $CO_2$ from the first stream and the residual unburned carbon from the second stream are furnished largely by the heat evolved from the first or high temperature oxidizing stream and to a lesser degree by the heat evolved in the partial combustion of carbon in the low temperature stream.

It is also important that the total or cumulative amounts of oxygen and coal supplied in both streams be in substantially the required stoichiometric proportions, or with a slight excess of carbon, to obtain a product gas having a relatively high content of CO and $CO+H_2$. For certain uses of the product gas, e.g. in the reduction of iron oxide ores, it is desirable that the $CO_2$ content of the gas be not more than about 10% with a CO:$CO_2$ ratio of at least about 7, and preferably the $CO_2$ content should not be more than about 5% with a CO:$CO_2$ ratio of at least about 10. A gas of such composition is readily obtained by means of the present invention.

In its simplest embodiment the invention comprises the opposed firing of two such streams arranged substantially 180° apart in generally coaxial alignment so as to utilize the minimum size combustion chamber or generator for the desired production capacity. However, it is not essential that the burners be arranged to have directly opposed firing and it may be more feasible in some cases to locate the burners so that the two streams intersect at some convenient angle less than 180°, e.g. an angle of about 90°. Also, in the case of large capacity units, it is preferred to employ a multiplicity of opposed or intersecting burners rather than increasing the size of a single pair of burners. One highly convenient arrangement is to locate a plurality of burners in circumferentially spaced arrangement around a combustion zone of generally circular cross-section. With such an arrangement it is preferred to employ combinations of 6, 10, 14, etc. burners in radially opposed pairs of high temperature oxidizing and low temperature non-oxidizing types so that both adjacent and diametrically opposed pairs of burners will have unlike combustion conditions whereby to realize the maximum benefits of the invention.

A very important advantage of the invention is found in the fact that the process is carried out at atmospheric or substantially atmospheric pressure. In the prior art it has often been considered necessary to operate at elevated pressures on the order of 100 to 500 p.s.i. in order to obtain what was thought to be the required retention time in the combustion zone and the necessary intimacy of contact between reacting species. Other advantages were also believed to accrue from the use of superatmospheric pressures. However, by operating at atmospheric or substantially atmospheric pressure I am able to realize a considerable saving in equipment costs since the combustion zone may be constructed almost entirely from ceramic or refractory materials without the necessity of an external high pressure steel shell. Not only is the original equipment cost considerably lower but there are also decided savings in construction costs and in maintenance costs because of the ease of access to the interior of the combustion zone. Furthermore, as discussed above, the reduction reaction between $CO_2$ and carbon to produce CO is obviously favored by low pressures by reason of the volume increase when one mol of $CO_2$ is converted to two mols of CO.

In some instances prior art workers in the coal gasification field have also imposed serious limitations on the design of gasification equipment in order to effect removal of coal ash as a liquid slag. By the use of the improved refractories now available and by operating in accordance with the principles herein discussed, it is usually possible to remove at least a portion of the ash as a liquid or semi-solid slag dependent upon the melting point of the ash. The remaining fly ash which is carried out with the product gas can be removed without undue difficulty by a water scrubber or the like and the extra cost of this ash removal step is more than compensated for by the high conversion efficiency of the process and by the fact that the combustion step can be operated at atmospheric pressure.

Of course, in addition to CO, the product gas will necessarily contain a certain amount of hydrogen by reason of the moisture and hydrocarbon content of the coal or other solid carbonaceous fuel. The water is reduced by reaction with hot carbon from the low temperature non-oxidizing flame to produce carbon monoxide and hydrogen according to the equation:

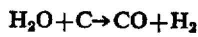

$$H_2O+C \rightarrow CO+H_2$$

In addition, the water gas shift reaction

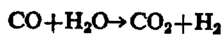

$$CO+H_2O \rightarrow CO_2+H_2$$

may also take place in the combustion zone. However, at the high temperatures usually existing in the combustion zone the equilibrium of the reaction is shifted to the left to favor production of carbon monoxide and water. Dependent upon the intended use of the product gas, it may be desirable to increase or decrease the amount of hydrogen present. For example, if the product gas is to be used for reducing iron oxide, it is desirable that the $H_2$:CO ratio be not greater than about 1 and preferably not greater than about 0.5 in order to obtain optimum gas utilization with the least heat burden on the reduction zone. On the other hand, if the product gas is to be utilized in a Fischer-Tropsch synthesis, it will be necessary to provide greater quantities of hydrogen in the product gas than are available from the hydrogen contained in coal or other solid carbonaceous fuels. For example, the usual $H_2$:CO ratio for synthesis gas is either about 1 or about 2 dependent upon the catalyst employed. In such case, steam may be introduced into the combustion zone as a separate stream directed toward the confluence or intersection of the oxygen and coal streams.

Referring now to the drawing, a general type of apparatus suitable for carrying out the process of the invention will be described.

In Figs. 1 and 2 a coal gasifier is shown having a base portion 10, an upright shaft portion 11, and an uppermost enlarged combustion or firing zone 12 which, in this instance, has a generally circular cross-sectional shape. The combustion zone 12 is provided with a pair of coaxial diametrically opposed burner nozzles 13 each of which has a main branch 14 through which an oxygen-rich gas is introduced and a side branch 15 for feeding pulverized coal. Thus, the pulverized coal is thoroughly premixed with oxygen-rich carrier gas prior to ignition of the stream at the burner outlet. As indicated by the arrows in Fig. 1, the opposed streams from the burner nozzles 13 impinge against each other at the central region of the combustion zone thereby resulting in turbulent intermixing of the flames and combustion products as previously described. In accordance with the principles of the present invention, the feed rates for the oxygen-rich gas and pulverized coal to each of the burners 13 are adjusted so that one of the burner nozzles emits an oxidizing stream at a high flame temperature with a high $CO_2$ content in the combustion products and the other burner nozzle emits a non-oxidizing stream at a relatively lower flame temperature with a high CO content and a substantial excess of unburned coal.

In this instance, the resulting product gas passes downwardly from the combustion zone 12 through the shaft 11 and is withdrawn through a lateral gas outlet 16. Under many circumstances, a substantial portion of the ash formed in the combustion process will be converted to a fluid or semi-solid slag which runs down the wall of the column 11 and collects as a fluid or semi-fluid pool 17 at the base of the shaft 11. From time to time, as required, the fluid slag can be removed through an outlet 18. However, it should be understood that the arrangement shown in the drawing may be subject to considerable structural modification while still utilizing the basic operating principle of the invention. For example, the generator may be designed to provide a product gas outlet at the uppermost portion of the generator with the combustion and firing zone being located below the gas outlet so that the product gases pass upwardly from the combustion zone and are removed from the upper portion of the apparatus. Dependent upon the temperature in the generator and the melting point of the ash as well as other operating conditions, it may be found that at least a portion of the residual coal ash formed in the gasification does not slag and must be withdrawn as fly ash in the product gas removed through the outlet 16. However, for most uses of the product gas, I have found that this presents no serious problem and the entrained ash can readily be removed by suitable separation means such as an electrostatic precipitator or a water scrubber, preferably the latter.

As shown diagrammatically in the drawing, the generator is preferably designed for operation at atmospheric pressure thereby permitting the construction to consist essentially of ceramic or refractory materials without the necessity for an external steel shell adapted to resist high pressures.

If it is desired to have a substantial hydrogen content in the product gas, as heretofore mentioned, steam may be introduced to the combustion zone through an inlet conduit 19 adapted to inject the steam downwardly into the region of convergence of the opposed burner nozzles 13.

In Fig. 3 a modification of the generator is shown wherein the burners, designated generally at 20, are located so that the flames and streams of combustion products intersect in impinging relation at an angle of approximately 90°. In certain instances, it will be found that the angular intersecting arrangement is preferable to the coaxial directly opposed scheme.

Typical operating results in accordance with the process of the present invention are given in the following example which is merely illustrative of the invention.

The apparatus used consisted of a refractory combustion zone operated at atmospheric pressure with a pair of directly opposed powdered coal burners in an arrangement generally similar to that shown in Fig. 1. Commercial grade straight oxygen (98–99%) was fed to the burners with powdered bituminous (Illinois) coal having a screen analysis of 100% under 10 mesh and 80% under 200 mesh. The coal had the following ultimate analysis on a moisture free basis:

| | Weight percent |
|---|---|
| C | 74.5 |
| $H_2$ | 4.8 |
| $N_2$ | 1.5 |
| $O_2$ | 9.1 |
| S | 0.9 |
| Ash | 9.2 |
| | 100.0 |

The data in the following table show the oxygen and coal requirements and the carbon efficiencies of the system at three different sets of operating conditions designed to produce one million standard cubic feet of contained $CO+H_2$ in the product gas.

| | Case 1 | Case 2 | Case 3 |
|---|---|---|---|
| Oxidizing Stream: | | | |
| $CO_2$:CO ratio | .04 | 1.0 | 2.0 |
| Coal, lbs | 21,400 | 11,900 | 11,400 |
| Oxygen, lbs | 17,600 | 20,900 | 22,300 |
| Flame Temperature, ° F | 2,900 | 3,500 | 4,000 |
| Non-Oxidizing Stream: | | | |
| Coal, lbs | 21,400 | 27,700 | 26,700 |
| Oxygen, lbs | 17,600 | 16,200 | 15,600 |
| Flame Temperature, ° F | 2,900 | 2,800 | 2,700 |
| Total for 1 million s.c.f. of $CO+H_2$ contained in Product Gas: | | | |
| Coal, lbs | 42,800 | 39,600 | 38,100 |
| Oxygen, lbs | 35,200 | 37,200 | 37,900 |
| Gas Temperature, ° F | 2,250 | 2,530 | 2,100-2,200 |
| Miscellaneous: | | | |
| Carbon efficiency, percent | 81.9 | 90.7 | 97.0 |
| Retention Time in Gasifier, sec | 2.78 | 2.32 | 2.70 |
| Total Volume of $CO+H_2$ generated (s.c.f.) | 1,000,000 | 1,000,000 | 1,000,000 |
| Total Volume of gas generated (s.c.f.) | 1,280,000 | 1,290,000 | 1,200,000 |
| Gas analysis— | | | |
| Percent $CO_2$ | 2.4 | 4.0 | 4.6 |
| Percent CO | 59.6 | 58.2 | 63.6 |
| Percent $H_2$ | 18.9 | 20.0 | 19.9 |
| Percent $N_2$ | 6.0 | 6.0 | 6.0 |

In Case 1 it will be seen that the two streams were identical but in Cases 2 and 3 the principles of the present invention were followed. Note in Cases 2 and 3 the materially increased carbon efficiency and the decreased coal consumption as compared with Case 1. This improvement was obtained in spite of the lower retention time in Cases 2 and 3 as compared with Case 1. In addition, the gas in Cases 2 and 3 was free of methane and other hydrocarbons. Thus, the process is capable of producing a reducing gas which is superior to that produced by other known coal gasification processes while possessing the added advantages of low retention time in the combustion zone at atmospheric pressure.

Although the invention has been described with reference to certain specific embodiments by way of illustration, it is to be understood that various modifications and equivalents may be resorted to without departing from the scope of the invention as defined in the appended claims.

I claim:

1. In the gasification of a solid carbonaceous fuel to produce a CO-containing gas, the improvement which comprises forming at least two streams of subdivided solid carbonaceous fuel suspended in an oxygen-rich gas, regulating the ratio of oxygen to fuel in one of said streams to obtain complete combustion of a substantial part of the carbon to $CO_2$ with a relatively high flame temperature, regulating the ratio of oxygen to fuel in the other of said streams to provide a sufficient excess of fuel to obtain incomplete combustion of only part of the carbon to CO with a relatively lower flame temperature and with residual unreacted carbon, and introducing said streams from spaced points into a combustion zone maintained at substantially atmospheric pressure and therein directing said streams toward each other in axially intersecting and impinging relation whereby to effect turbulent intermixing of the resulting flames and combustion products, the relatively high flame temperature of said one stream providing sufficient thermal energy to effect endothermic reaction of a major portion of the $CO_2$ contained therein with the excess unreacted carbon contained in said other stream whereby to obtain a product gas rich in CO and $H_2$ and containing not more than about 10% $CO_2$.

2. The process of claim 1 further characterized in that said product gas contains not more than about 5% $CO_2$.

3. The process of claim 1 further characterized in that said streams are arranged in substantially opposed coaxial relation.

4. The process of claim 1 further characterized in that said streams are arranged to intersect at an angle of approximately 90°.

5. The process of claim 1 further characterized in that the flame temperature of said one stream is within the range of from about 3200° F. to about 4200° F. and the flame temperature of said other stream is from about 2700° F. to about 3000° F.

6. The process of claim 1 further characterized in that said fuel comprises pulverized coal.

7. The process of claim 1 further characterized in that said oxygen-rich gas contains at least about 85% oxygen.

8. The process of claim 1 further characterized in that said oxygen-rich gas consists essentially of free oxygen.

9. The process of claim 1 further characterized in that slag is produced from residual ash during the combustion of said fuel and is withdrawn from the combustion zone.

10. In the gasification of coal to produce a CO-containing gas especially adapted for use in the reduction of iron oxide ore, the improvement which comprises forming at least two streams of pulverized coal in an oxidizing gas containing at least 85% oxygen, regulating the ratio of oxygen to coal in one of said streams to effect substantially complete combustion of a substantial part of the carbon in the coal to $CO_2$ whereby to obtain in said one stream a relatively high flame temperature of from about 3200° F. to about 4200° F. and whereby the combustion products of said one stream have a $CO_2$:CO ratio of from about 1.0 to about 5.0, regulating the ratio of oxygen to coal in the other of said streams to provide a sufficient excess of carbon to obtain only partial combustion of only a portion of the carbon in the coal to CO whereby to provide in said other stream a relatively lower flame temperature of from about 2700° F. to about 300° F. with residual unreacted carbon, introducing said streams from separate spaced points into the interior of a combustion zone maintained at substantially atmospheric pressure and directing said streams toward each other in axially intersecting and impinging relation whereby to effect turbulent intermixing of the resulting flames and combustion products within said combustion zone, the relatively high flame temperature of said one stream providing sufficient thermal energy to effect endothermic reaction of a major portion of the $CO_2$ contained therein with excess unreacted carbon contained in said other stream whereby to convert $CO_2$ to CO, and withdrawing from said combustion zone a product gas rich in CO and $H_2$ and containing not more than about 10% $CO_2$ and having a CO:$CO_2$ ratio of at least about 7.

11. The process of claim 10 further characterized in that the product gas withdrawn from the combustion zone contains not more than about 5% $CO_2$ and has a CO:$CO_2$ ratio of at least about 10.

12. The process of claim 1 further characterized by the introduction of steam into said combustion zone which reacts with part of the excess carbon contained in said other stream thereby increasing the hydrogen content of the CO-containing product gas.

13. The process of claim 10 further characterized by the introduction of stream into said combustion zone which reacts with part of the excess carbon contained in said other stream thereby increasing the hydrogen content of the CO-containing product gas.

14. The process of claim 1 further characterized in that from about 35% to about 85% by weight of the carbon in said one stream is burned to $CO_2$, and from about 65% to about 85% by weight of the carbon in said other stream is burned to CO.

15. The process of claim 10 further characterized in that from about 35% to about 85% by weight of the carbon in said one stream is burned to $CO_2$, and from about 65% to about 85% by weight of the carbon in said other stream is burned to CO.

References Cited in the file of this patent

UNITED STATES PATENTS

| | | |
|---|---|---|
| 1,039,398 | Hirt | Sept. 24, 1912 |
| 2,621,117 | Garrison | Dec. 9, 1952 |
| 2,702,744 | Totzek | Feb. 22, 1955 |
| 2,716,598 | Moses | Aug. 30, 1955 |

FOREIGN PATENTS

| | | |
|---|---|---|
| 536,585 | Canada | Jan. 29, 1957 |

UNITED STATES PATENT OFFICE

CERTIFICATION OF CORRECTION

Patent No. 2,962,367 November 29, 1960

Frank W. Luerssen

It is hereby certified that error appears in the above numbered patent requiring correction and that the said Letters Patent should read as corrected below.

Column 8, line 51 for "300° F." read -- 3000° F. --.

Signed and sealed this 2nd day of May 1961.

(SEAL)
Attest:

ERNEST W. SWIDER
Attesting Officer

DAVID L. LADD
Commissioner of Patents